A. EAMES.
Muzzle-Loading Ordnance.
No. 4,960.   Patented Feb. 5, 1847.
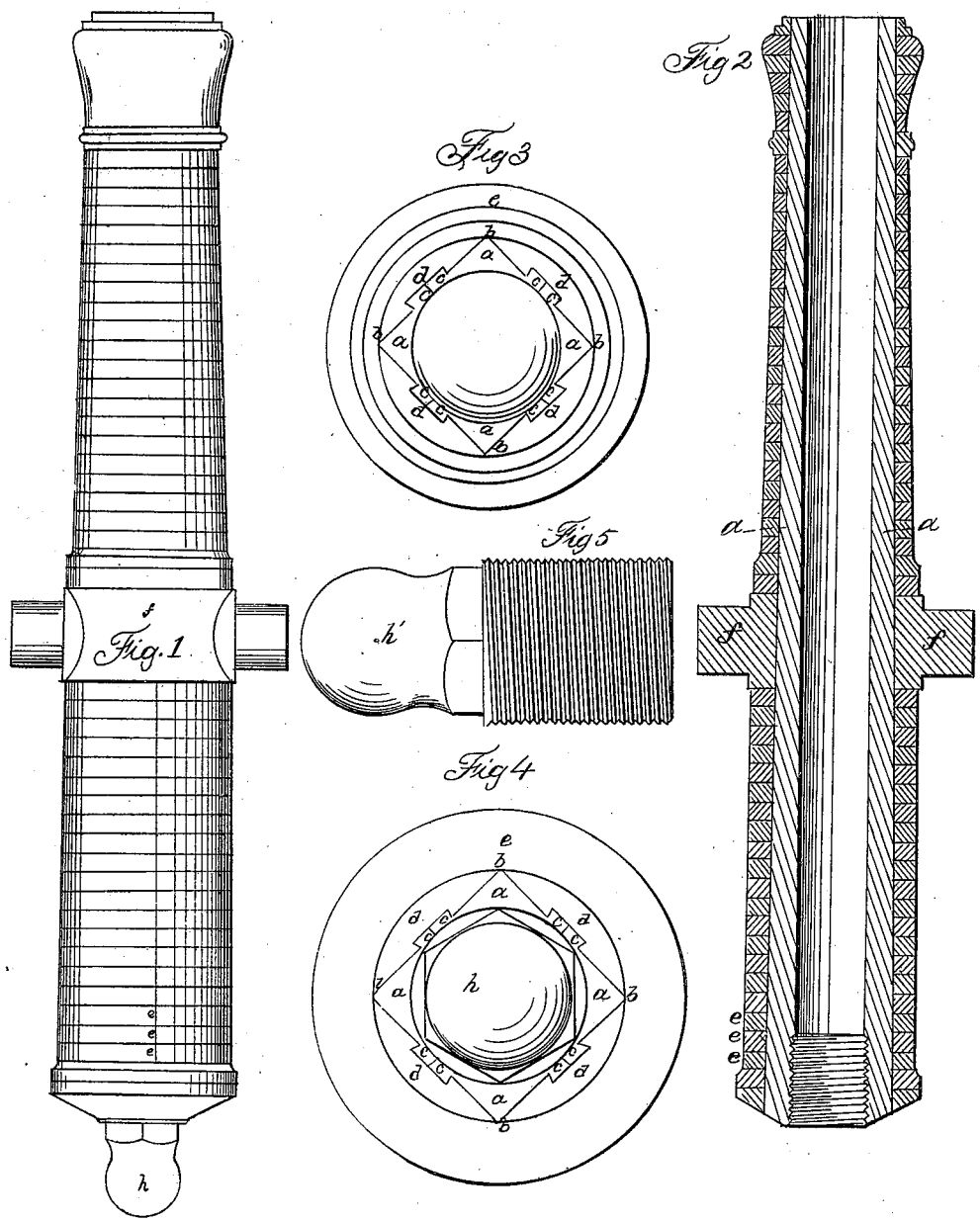

UNITED STATES PATENT OFFICE.

ALBERT EAMES, OF CHICOPEE FALLS, MASSACHUSETTS.

IMPROVEMENT IN WROUGHT-IRON CANNON.

Specification forming part of Letters Patent No. 4,960, dated February 5, 1847.

*To all whom it may concern:*

Be it known that I, ALBERT EAMES, of Chicopee Falls, in the county of Hampden and State of Massachusetts, have invented a new and useful Improvement in the Method of Constructing Wrought-Iron Cannons; and I do hereby declare that the following is a full, clear, and exact description of the principle or character which distinguishes my invention from all other things before known, and of the manner of making, constructing, and using the same, reference being had to the accompanying drawings, making part of this specification, in which—

Figure 1 is a plan of the cannon; Fig. 2, a horizontal section; Fig. 3, an end view of the muzzle; Fig. 4, an end view of the breech; and Fig. 5, a separate representation of the breech-pin, Figs. 3, 4, and 5 being drawn double the size of Figs. 1 and 2.

The same letters indicate like parts in all the figures.

The nature of my invention consists in a peculiar manner of connecting the staves and hoops of wrought-metal cannons by making the caliber or bore of a series of staves held together by a second series of staves breaking joints with the first series, and embracing dovetailed or other projections on them, and then the whole bound together by hoops or rings. The inner caliber or bore is formed of any number of staves, $a$, (four being the number which I prefer,) extending from end to end of the piece, and planed to form a good joint where they come together, the outside forming a figure of as many sides as there are staves, the angles $b$ being in the middle of each stave. These staves, where they come together, are provided with dovetail or other formed projections $c\ c$, which are embraced by the second set of staves, $d$, properly grooved out to fit the projections, so that when the two series of staves are put together they hold each other and form a connected mass. All the faces of the inner series and the inner face of the outer series are planed before putting them together, and the grooves in the outer series are made sufficiently small to admit of shrinking them on, and then the outer surface of the whole is turned down to a true taper from butt to muzzle to receive a series of rings or hoops, $e$, properly turned, fitted, and shrunk on, and for the purpose of more perfectly securing these rings and preventing them from starting by the effects of concussion and vibration those at the muzzle may be screwed or stacked on. The ring $f$, of which the trunnions make part, should be made of greater size than the others to afford the requisite strength. The breech-pin $h$ is screwed in to complete the gun. With the view to make all the joints of the staves and hoops more perfect and the whole more solid, the joints are all tinned and the parts shrunk on with soft solder. As the outer surfaces of the staves, when put together, form the frustum of a cone, the two sets of staves should be made thicker at the breech than at the muzzle, and, if desired, the inner series of staves may be lined with steel.

It will be obvious from the foregoing that the number of staves may be increased or decreased at pleasure, so long as the two series are composed of an equal number and the outer lap joints with the inner series and embrace the projections on the inner series at their junctions.

I am aware that wrought-iron cannons have been made of staves and hoops, and therefore I wish it to be distinctly understood that I do not claim this as of my invention; but What I do claim as my invention, and desire to secure by Letters Patent, is—

1. Connecting together the inner series of staves by means of the outer or second series breaking joints with the first and embracing projections thereon, substantially as herein described.

2. The hoops or rings, in combination with the two series of staves put and connected together in the manner herein described, whereby the whole is bound and properly secured together, as herein described.

ALBERT EAMES.

Witnesses:
DAVID M. BRYANT,
RUSSELL E. DEWEY.